United States Patent [19]
Hibler

[11] Patent Number: 5,321,206
[45] Date of Patent: Jun. 14, 1994

[54] WALLCOVERING TEMPLATE FOR COVERING ELECTRICAL WALL COVER PLATES

[76] Inventor: Stanley A. Hibler, 5491 San Gabriel Dr., Apt. B, Columbus, Ohio 43213

[21] Appl. No.: 837,044

[22] Filed: Feb. 18, 1992

[51] Int. Cl.$^5$ .............................................. G01B 3/14
[52] U.S. Cl. ...................................... 174/66; 33/562; 33/DIG. 10
[58] Field of Search .................... 174/48, 66; 220/241, 220/3.4; 33/528, 562, 563, DIG. 10; 248/906

[56] References Cited

U.S. PATENT DOCUMENTS

| | | | |
|---|---|---|---|
| 2,775,812 | 1/1957 | Mohr | 248/906 X |
| 3,116,563 | 1/1964 | Gelbman | 33/DIG. 10 |
| 3,888,013 | 6/1975 | Benoit | 220/3.4 X |
| 3,924,331 | 12/1975 | Goosen | 30/366 |
| 4,312,458 | 1/1982 | Stewart | 220/241 |
| 4,353,759 | 10/1982 | Stallings | 174/66 X |
| 4,589,211 | 5/1986 | Policka | 33/562 X |

*Primary Examiner*—Leo P. Picard
*Assistant Examiner*—David Tone
*Attorney, Agent, or Firm*—Mueller and Smith

[57] ABSTRACT

The present invention is directed to a method for covering electrical wall cover plates with wallcovering in registration with wallcovering on the wall surrounding the electrical wall cover plates. The method and template used therewith enable, not only the professional, but also the homeowner, to cover electrical wall cover plates easily to achieve registration. The method comprises the steps of securing a template to the wall in place of the electrical wall cover plate to be covered. The template comprises a generally rectangular thin plate containing apertures as those contained by the electrical wall cover plate. The template also bears rigid pins projecting outwardly from the template which pins are located at the corners of the electrical wall cover plate. The pins, then, define the size of the electrical wall cover plate and locate the apertures. The template, accordingly, is larger in size than the electrical wall cover plate. Next, a sheet of wallcovering is placed over the template in registration with the pattern (pattern, texture, or color variation) on the wallcovering on the surrounding wall. The sheet of wallcovering then is pressed to puncture it with the template rigid pins. The template and sheet of wallcovering then are removed from the wall and excess wallcovering is trimmed, if necessary, so that the size of the sheet of wallcovering is the same size as the template. The wallcovering then is removed from the template and placed over the electrical wall cover plate with the punctures located at the corners of the electrical cover plate. The sheet of wallcovering is affixed to the electrical cover plate, typically with conventional wallpaper adhesive, which may be used whether or not the wallcovering is of the self-adhesive kind. The edges or selvage of the sheet are folded over to the back side of the electrical wall cover plate. The portions of the sheet covering the apertures in the electrical wall cover plate then are removed. Finally, the covered electrical wall cover plate is attached to the wall.

11 Claims, 2 Drawing Sheets

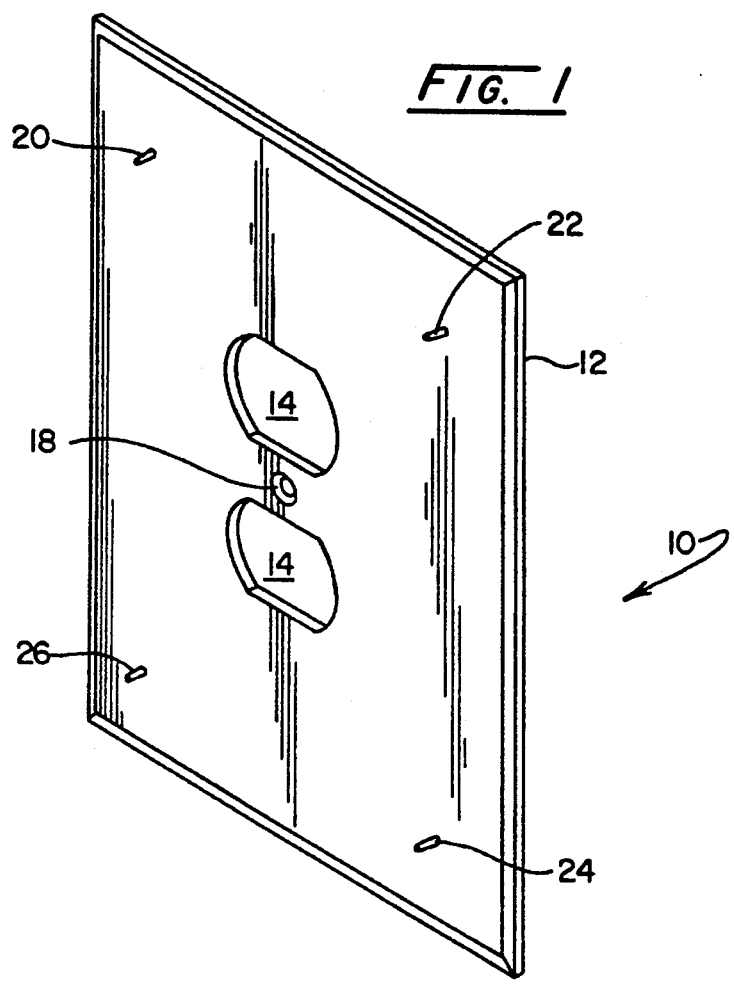
FIG. 1
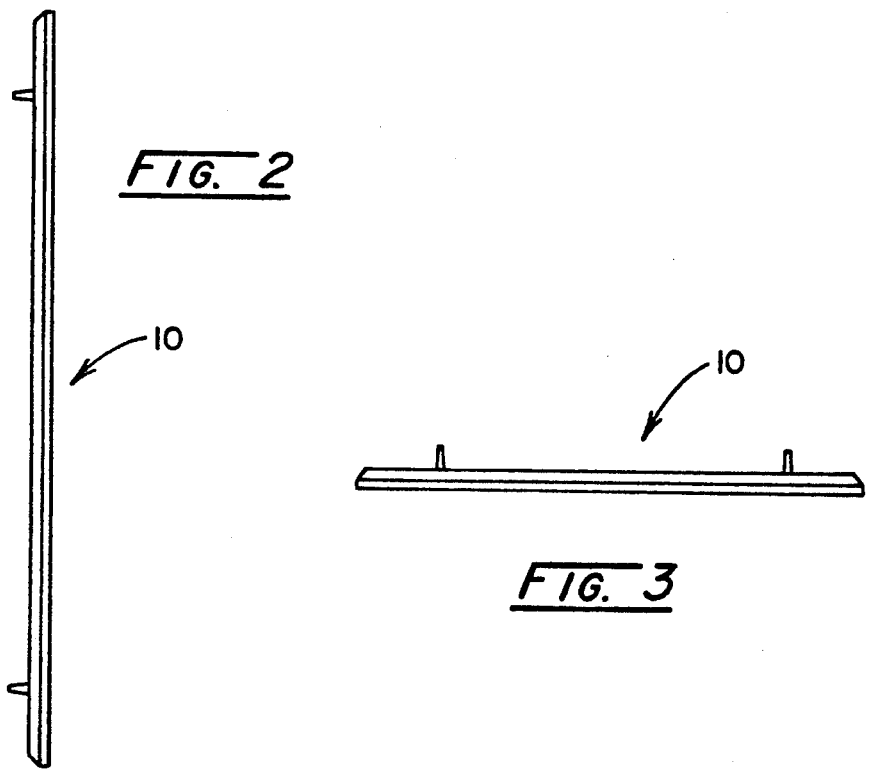
FIG. 2
FIG. 3

WALLCOVERING TEMPLATE FOR COVERING ELECTRICAL WALL COVER PLATES

BACKGROUND OF THE INVENTION

The present invention relates to a method for covering electrical wall cover plates with wallcovering in registration with wallcovering on the wall surrounding the electrical wall cover plate and to a template useful in such method.

A variety of electrical boxes are mounted in walls and covered by an electrical wall cover plate. Typical are electrical switches, electrical outlets, fuseboxes, and the like, each with a corresponding electrical wall cover plate. Decorators, be they professional or do-it-yourselfers, often find such electrical wall cover plates to be out of character when the wall is covered with a wallcovering, such as wallpaper, which contains a pattern, texture, or color variation. This is true even with ornate or fancy electrical wall cover plates. In an effort to bring harmony to the situation, the installer attempts to cover the electrical wall cover plates with the same wall covering that is used on the surrounding walls. However, precisely matching the pattern, texture, or color variation, on the electrical wall cover plate to the surrounding wallcovering can be a difficult task at best. Mismatching often occurs and the installer often wonders whether the time spent in seeking a match is worth the effort and time of installation.

BROAD STATEMENT OF THE INVENTION

The present invention is directed to a method for covering electrical wall cover plates with wallcovering in registration with wallcovering on the wall surrounding the electrical wall cover plates. The method and template used therewith enable, not only the professional, but also the homeowner, to cover electrical wall cover plates easily to achieve registration. The method comprises the steps of securing a template to the wall in place of the electrical wall cover plate to be covered. The template comprises a generally rectangular thin plate containing apertures as those contained by the electrical wall cover plate. The template also bears rigid pins projecting outwardly from the template which pins are located at the corners of the electrical wall cover plate. The pins, then, define the size of the electrical wall cover plate and locate the apertures. The template, accordingly, is larger in size than the electrical wall cover plate. Next, a sheet of wallcovering is placed over the template in registration with the pattern (pattern, texture, or color variation) on the wallcovering on the surrounding wall. The sheet of wallcovering then is pressed to puncture it with the template rigid pins. The template and sheet of wallcovering then are removed from the wall and excess wallcovering is trimmed, if necessary, so that the size of the sheet of wallcovering is the same size as the template. The wallcovering then is removed from the template and placed over the electrical wall cover plate with the punctures located at the corners of the electrical cover plate. The sheet of wallcovering is affixed to the electrical cover plate, typically with conventional wallpaper adhesive, which may be used whether or not the wallcovering is of the self-adhesive kind. The edges or selvage of the sheet are folded over to the back side of the electrical wall cover plate. The portions of the sheet covering the apertures in the electrical wall cover plate then are removed. Finally, the covered electrical wall cover plate is attached to the wall.

Advantages of the present invention include a simple, yet reliable method for covering electrical wall covers with wallcovering so that the installed plate bears wallcovering in registration with the wallcovering on the surrounding wall. Another advantage is the ability to precisely locate the wallcovering to be cut away to reveal the apertures contained in the electrical wallcovering plates. Yet another advantage is that the template is reusable. Yet another advantage is the ability to produce a family of templates for use in covering a variety of electrical wall cover plates due to the flexibility of the inventive method. These and other advantages will be readily apparent to those skilled in the art based upon the disclosure contained herein.

BRIEF DESCRIPTION OF THE DRAWINGS

FIG. 1 is a perspective elevational view of the front side of the novel template;

FIG. 2 is a side elevational view of the template depicted in FIG. 1;

FIG. 3 is an end elevational view of the template depicted in FIG. 1;

Figure 4:
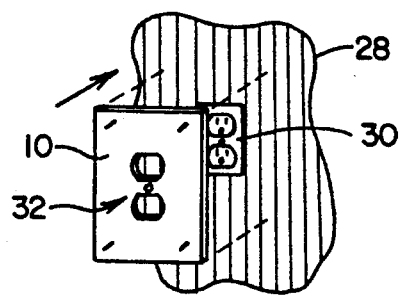
FIGS. 4–12 depict the use of the template in the inventive method for covering of an electrical wall cover plate with wallcovering in registration with wallcovering surrounding the electrical wall cover plate.
Figure 5:
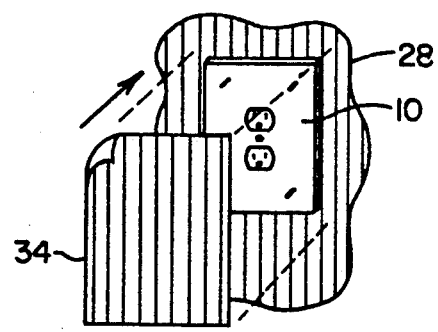

The drawings will be described in detail below.

DETAILED DESCRIPTION OF THE INVENTION

Template 10 in FIG. 1 is seen to be composed of a generally rectangular thin base plate 12 which contains apertures 14, and screw hole 18. Additionally, plate 12 retains outwardly projecting rigid pins 20–26. Pins 20–26 define the outer corners of the electrical wall cover plate (e.g. electrical receptacle cover plate 52, see FIG. 9) that is desired to be covered with wallcovering. Although the present invention is illustrated in connection with an electrical wall cover plate having receptacle apertures, it will be appreciated by one of ordinary skill in the art that the invention is adaptable for use with cover plates having apertures configured for receiving switches, coaxial cables, telephone jacks, or with cover plates having no apertures. Apertures 14 are in registration with the apertures in the electrical cover plate as defined by pins 20–26. FIGS. 2 and 3 reveal base plate 12 to have a substantially flat back with only pins 20–26 protruding from the front surface thereof.

While template 10 may seem simple in construction, it is quite unique in its ability to enable the installer to readily and reliably cover an electrical cover plate with wallpaper that, when the electrical cover plate is reinstalled, is in registration with the pattern, texture, or color variation in the wallcovering surrounding the electrical wall cover plate. Pattern, texture, and color variation are illustrative of indicia on the surrounding wallcovering to be matched and, thus, such terms are to be construed broadly. In order to illustrate the inventive method of the present invention, reference to FIGS. 4–12 is made.

Figure 6:
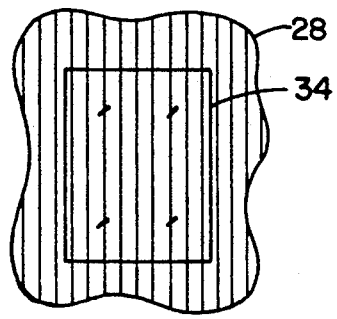

Initially, it will be observed that wall 28 is covered with a wallcovering having a vertical striped pattern (i.e., indicia to be matched on the electrical wall cover plate). It is desired to cover an electrical wall cover plate with wallpaper that matches or is in registration with the pattern on wall 28. The electrical wall cover plate will cover electrical outlet 30 which is seen to have two outlets. As an initial step, template 10 is secured to wall 28 by screw 32 which runs through hole 18 in template 10. Next, sheet 34, which is a small sheet of the same wallcovering as is installed on wall 28, is placed over template 10 and the pattern aligned with the pattern on wall 28 as can be seen by reference to FIG. 6. When registration is achieved, sheet 34 is pressed so that pins 20-26 puncture sheet 34 as can be seen in FIG. 6.

A simple technique for achieving registration is to align one corner of the pattern of sheet 34 with wall 28 and then puncture sheet 34 with only one of the pins, for example pin 22. Next, sheet 34 then can be rotated around to achieve registration on the opposite side and another puncture made. Depending upon the complexity of pattern, texture, or color variation, a variety of installation techniques may be used in order to achieve registration of piece 34 with wall 28.

Figure 7:
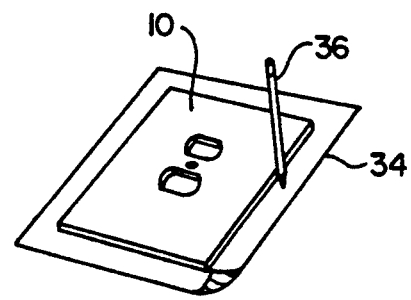
Figure 8:
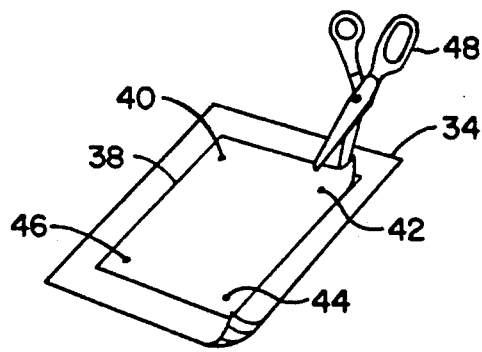

In the next step of the method, template 10 and sheet 34 are removed by removing screw 32 and the assembly placed with the template side up as depicted at FIG. 7. Required now is the removal of the excess material from sheet 34 so that it is reduced in size to the size of template 10. A variety of techniques can be employed, including taking scissors or a utility knife and cutting along template 10. Alternatively, use of pencil 36 to mark the outline of template 10 on the back side of sheet 34 may be employed. Removal of template 10, then reveals sheet 34 with line 38 and punctures 40-46. Scissors 48 or other cutting device then can be used to cut along line 38 to remove the excess wallcovering.

Figure 9:
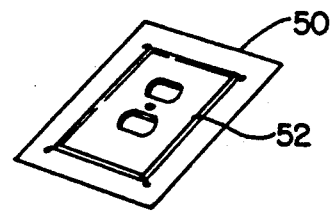

Next, electrical receptacle cover plate 52 is placed on sheet 50 by aligning its corners with punctures 40-46 as can be seen at FIG. 9. The back side of cover plate 52 is placed upwardly so that its front face is placed against the back side of sheet 50.

Figure 10:
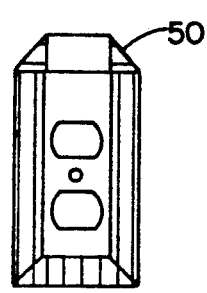
Figure 11:
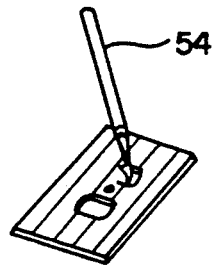
Figure 12:
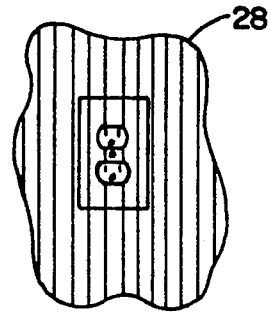

Next, sheet 50 is wetted if it is of the self-adhesive type or adhesive placed on the back side, or a combination thereof. Regardless of the technique in order to achieve adherence of sheet 50 to cover plate 52, attachment is made with the edges being folded over to the back side of cover plate 52 as shown in FIG. 10. The apertures cover plate 52 can be removed with utility knife 54 or similar implement. It is suggested that a small slice be made over the screw hole rather than to try to cut a section of wallpaper therefrom. Finally, FIG. 12 shows the covered electrical wall plate reinstalled on wall 28 and the pattern from piece 50 being in registration therewith.

Accordingly, a simple, yet reliable, technique has been disclosed for covering electrical wall covers with wallcovering in order to achieve registration with the wallcovering on the wall surrounding the electrical wall cover plate. It will be appreciated that template 10 could be made in a variety of sizes and styles depending upon whether a two or more electrical outlet was being covered, a wall switch, or combination thereof. In fact, any cover plate on a wall which cover plate is to be covered with wallcovering can have a suitable template molded and the inventive technique employed. By placing pins 20-26 at the outer corners of the electrical cover plate, placement of apertures 14, and screw hole 18, ensures that the wallpaper covering the electrical cover plate retains its registration from that achieved as depicted at FIG. 6, and retains the desirable ability of removing the wallcovering from the apertures to reveal the electrical outlet, switch, or other operable device being covered by the electrical wall cover plate.

I claim:

1. A method for covering an electrical wall cover plate which may have one or more apertures with wallcovering in registration with wallcovering on the wall surrounding the electrical wall cover plate, which comprises the steps of:

(a) securing a template to the wall in place of the electrical wall cover plate, said template comprising:

a generally rectangular thin plate containing apertures as those contained by the electrical wall cover plate and bearing rigid pins projecting outwardly from said template and located at the corners of the electrical wall cover plate, said template being larger in size than the electrical wall cover plate;

(b) placing a sheet of wallcovering over said template in registration with an indicia on the wallcovering on the surrounding wall;

(c) pressing on said sheet of wallcovering to puncture it with said template rigid pins;

(d) removing said template from said wall and trimming said sheet, if necessary, to the size of said template;

(e) removing said sheet of wallcovering from said template and placing it over said electrical wall cover plate with the punctures located at the corners thereof;

(f) affixing said sheet of wallcovering to said electrical wall cover plate with its edges folded over to the back side thereof;

(g) removing portions of said sheet of wallcovering from the apertures thereof; and (h) attaching said electrical wall cover plate to said wall.

2. The method of claim 1, wherein said template additionally bears a screw hole and is secured to the wall with a screw which is placed therethrough.

3. The method of claim 1, wherein said template bears 4 rigid pins which form a generally rectangular pattern.

4. The method of claim 1, wherein said indicia is one or more of a pattern, texture, or color variation.

5. The method of claim 1, wherein said wallcovering comprises wallpaper.

6. A system for covering an electrical cover plate with wallcovering in registration with corresponding wallcovering on a surrounding wall comprising:

an electrical cover plate having four corners defining its perimeter and which may have one or more apertures;

a sheet of wallcovering for covering said plate; and a generally planar template having a perimeter larger than the perimeter of said plate and being apertured in correspondence therewith, said template bearing at least a pair of diametrically-opposed, outwardly-projecting rigid pins each positioned to define a corresponding corner of said plate for puncturing said wallcovering to define puncture points for alignment with the corners of said plate when said plate is covered with said wallcovering.

7. The system of claim 6 wherein said electrical cover plate has at least one aperture.

8. The system of claim 6 wherein said template additionally contains a screw hole for its attachment with a screw to an electrical box or an electrical component housed therewithin having a corresponding screw hole.

9. The system of claim 6 wherein said cover plate has a generally rectangular perimeter and said template bears four said rigid pins defining the generally rectangular perimeter of said cover plate.

10. The system of claim 6 which is packaged with instructions relating to its use in the covering of an electrical cover plate with wallcovering in registration with corresponding wallcovering on a surrounding wall.

11. A template for use in covering an electrical wall cover plate which may have one or more apertures with wallcovering in registration with wallcovering on the wall surrounding the electrical wall cover plate, which template comprises a generally rectangular thin plate containing apertures as those contained by the electrical wall cover plate and bearing rigid pins projecting outwardly from said template and located at the corners of the electrical wall cover plate, said template being larger in size than the electrical wall cover plate and being packaged with instructions relating to its use in the covering of an electrical cover plate with wallcovering in registration with corresponding wallcovering on a surrounding wall.

* * * * *